United States

Wildhaber

[11] 3,781,078
[45] Dec. 25, 1973

[54] OPTICAL SCANNER WITH LASER
[76] Inventor: Ernest Wildhaber, 124 Summit Dr., Brighton, N.Y. 14620
[22] Filed: Dec. 20, 1971
[21] Appl. No.: 209,622

[52] U.S. Cl.................. 350/6, 178/7.6, 250/219 D, 250/219 CR, 250/236
[51] Int. Cl.... G01n 21/30, G02b 17/00, H04n 3/00
[58] Field of Search ................ 250/219 D, 219 CR, 250/236; 350/6, 7; 178/7.6

[56] References Cited
UNITED STATES PATENTS
3,602,572   8/1971   Norris, Jr.............................. 350/7

Primary Examiner—James W. Lawrence
Assistant Examiner—T. N. Grigsby
Attorney—B. Edward Shlesinger

[57] ABSTRACT

In this optical scanner the light source is a laser emitting light through lenses of a rotor to a record. The laser unit emits light through a stationary line-like area. As the laser beam is of limited angular sweep the invention provides a refractory part rigid with the rotor and of varying thickness to deflect said beam, causing it to follow the lens of the turning rotor that projects said beam to the record. The refractory part may be in the form of a ring of an average radius approximately equal to the distance of said lenses from the rotor axis. Or it may be in the form of sectors alternating with said lenses.

9 Claims, 14 Drawing Figures

PATENTED DEC 25 1973 3,781,078
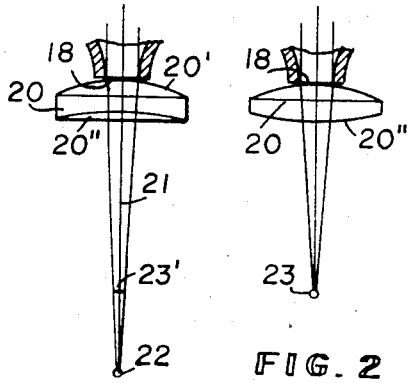
FIG. 1  FIG. 2
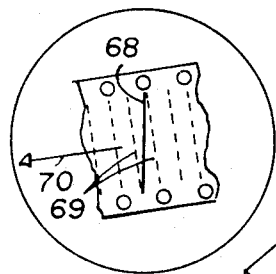
FIG. 5
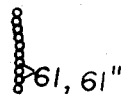
FIG. 9
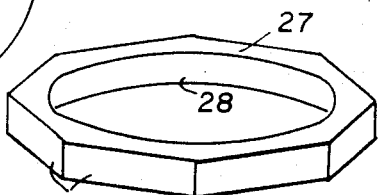
FIG. 6
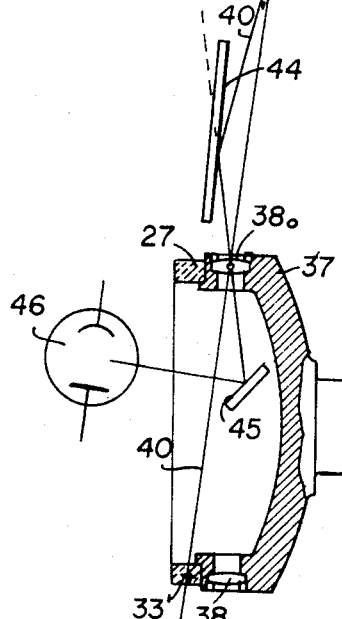
FIG. 3
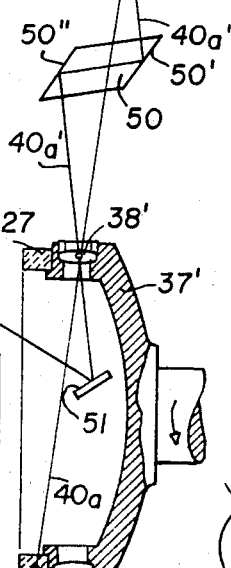
FIG. 4
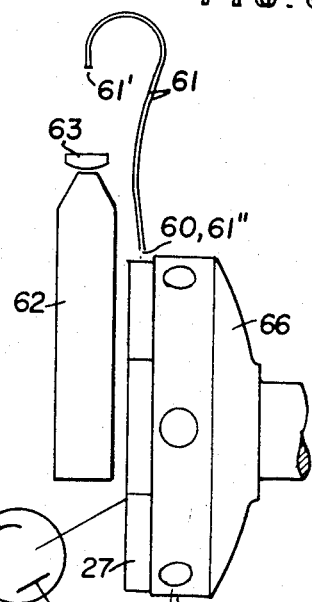
FIG. 8
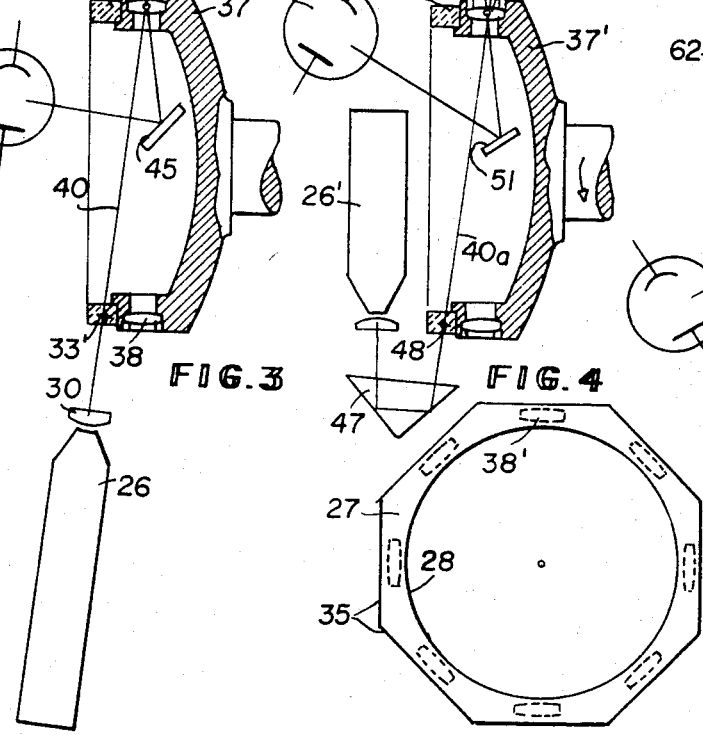
FIG. 7
INVENTOR:
Ernest Wildhaber INVENTOR:
Ernest Wildhaber 3,781,078

OPTICAL SCANNER WITH LASER

The present invention relates to optical scanners using a laser to illuminate a narrow line-like area of a record through a lens of a rotor, where this area moves along a line of characters as the rotor turns. The laser unit of the invention is stationary, and it emits light through a narrow stationary line-like area, of which said lens forms a moving optical image on the record.

To make up for the limited angular sweep of a laser, the invention provides a refractory part of varying thickness, forming part of the rotor, to deflect the laser beam so that it follows the rotating lens that forms said optical image.

The light-emitting, stationary line-like area is preferably placed inside of said refractory part, so that the only function of said part is light deflection, practically without affecting the image itself. The laser is preferably of non-pulsating type. The invention will be particularly described for a gas laser. However the principles apply also to solid-state lasers.

The present invention can be considered an improvement of the inventions described in my patent applications "Optical Scanning Apparatus," Ser. No. 17,792 and "Optical Scanner With Straight Scanning Line," Ser. No. 130,735, now U.S. Pat. No. 3,634,696, issued Jan. 11, 1972 and U.S. Pat. No. 3,700,911, issued Oct. 24, 1972 respectively.

An object of the invention is to provide means for using a laser unit requiring a minimum of energy, producing a minimum of heat, and that is low in cost and maintenance. Other objects will appear in the course of the specification and in the recital of the appended claims.

Embodiments of the invention will be described with the drawings, in which

FIG. 1 is a diagram showing one way of emitting laser light through a narrow line-like area.

FIG. 2 is a side view corresponding to FIG. 1.

FIG. 3 is a fragmentary and simplified view of a scanner constructed according to the present invention, its rotor being shown in axial section. It operates with a straight scanning line.

FIG. 4 is a modification thereof.

FIG. 5 is a top view showing one way of feeding a record, and corresponding to FIGS. 3 and 4.

FIG. 6 is a perspective view of the refractory part 27 shown in FIGS. 3 and 4, that deflects the laser beam and causes it to follow the projecting lens of the rotor.

FIG. 7 is an axial view of said refractory part, looking along the rotor axis.

FIG. 8 is a view similar to FIG. 3 of a further modification.

FIG. 9 is a diagram showing how a narrow line-like area of light emission can be achieved with fiber optics.

Figure 10:
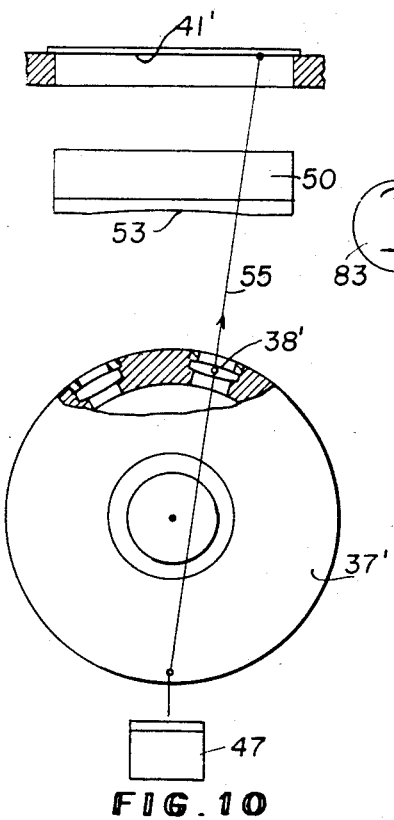
FIG. 10 is a view taken along the rotor axis from the right of FIG. 4, the rotor being shown partly in section.

FIGS. 1 and 2 show a lens 20 placed adjacent the mouth 18 of a gas laser that emits rays parallel to central ray 21. The upper side 20' of lens 20 is a spherical surface adapted to direct the rays of the beam to intersect at focus 22. The lower side 20'' of lens 20 is a cylindrical surface with straight profile in the plane of FIG. 1. It does not affect the path of the rays in the view of FIG. 1. However it converges the rays more in the view of FIG. 2, so that in this view they appear to intersect at 23. The rays then pass through a short straight line 23' (FIG. 1). This is the area of light emission of the laser unit that comprises the laser and lens 20.

Line 23' (FIG. 1) has a length as compared with the width of laser mouth 18 in the proportion of its distance 22-23' from focus 22 to the distance of mouth 18 therefrom. If a length equal to the width of laser mouth 18 is desired, then a plane side should be used on lens 20 instead of cylindrical surface 20''. Referring now to FIG. 3, a gas laser 26 emits its beam through a lens 30 that corresponds to the described lens 20. It causes the rays to pass through a narrow line-like area 33' which corresponds to line 23' of FIG. 1. It may be said then that the laser unit emits light from area 33'. This area is preferably placed inside of a refractory part 27 shown also in FIGS. 6 and 7.

Figure 13:
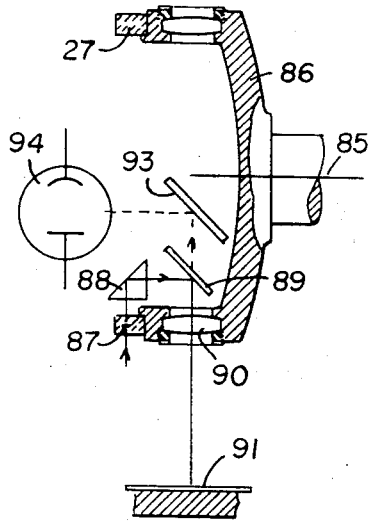
FIG. 13 is an axial section of a rotor, showing also associated parts, of an embodiment with an arcuate scanning line.

Part 27 is also used in the modifications of FIGS. 4, 8 and 13. In the instance illustrated it has a cylindrical inside surface 28 and an outside surface 35 following a polygon. It may however also have a curved outside profile in the view of FIG. 7, depending on the index of refraction. It has preferably a straight profile parallel to the rotor axis at least on the outside surface. The varying thickness acts like a varying prism. It deflects the rays to let the beam follow the motion of the lens of the rotor that projects light area 33' to the record, to illuminate at anyone instant a narrow line-like area thereof, an area that extends perpendicular or nearly perpendicular to the line of characters of the record.

Rotor 37 contains a plurality of lenses 38 equally spaced about its axis of rotation. They are arranged in a circle about said axis. The laser unit is so positioned that the mean ray 40 of its beam passes through lens $38_0$ to the record 41, through a slit 42 of the stationary frame 43 of the scanner. Slit 42 extends in the direction of the scanning line, which is here straight. FIG. 10 shows a view along the rotor axis of the modification shown in FIG. 4 that is generally similar to FIG. 3.

Diffused light is reflected back from the illuminated area. Part of it hits a plane stationary mirror 44, as indicated by a mean ray 40'. Ray 40' and rays around it are reflected to pass through lens $38_0$ to a stationary plane mirror 45 and thence to a photocell 46. This photocell converts the variation of light intensity into electric impulses, for instance for storage on tape, or for transmission to a computer or to a distant station.

A more complete description of the function is afforded by application Ser. No. 130,735. It also shows why equal distances of the lighted record area (FIG. 3) and of the line of light emission 33' from lens $38_0$ provide a most accurate straight scanning line.

The modification shown in FIG. 4 shows a laser 26' more conveniently placed than laser 26 of FIG. 3. A double-reflecting prism 47 restores the described direction of the mean ray (40a), so that the laser unit provides a fixed line-like area 48 of light emission, adjacent the periphery of the rotor 37'. Like area 33' of FIG. 3 it is placed inside the refractory part 27 that is identical with part 27 of FIG. 3. This part may be made of Lucite, glass or any other suitable refractory material. It is bonded to the rotor 37' that is identical with rotor 37. Mean ray 40a is directed to pass through lens 38' to the record 41'. A double-prism 50 catches some of the diffused light reflected from the lighted record area and directs it through lens 38' to a stationary mirror 51 and thence to a photocell 52. 40a' denotes a reflected mean ray of light that is further reflected at the opposite plane sides 50', 50" of prism 50. Double-prism 50 may have its reflective plane 50" reduced in width in the middle region, as indicated by the curved profile 53 in FIG. 10. The reflected light weakens somewhat towards both ends of the character lines. The curved profile 53 reduces the reflective area in the mid-portion and evens up the light intensity transmitted to photocell 52.

A mean ray directed to the record 41' is indicated at 55 in FIG. 10. A mean reflected ray projects into the same line between the record and lens 38' in this axial view.

The modification shown in FIG. 8 uses fiber optics to emit light from a narrow line-like area 60. One end (61") of a plurality of optical fibers 61 is arranged in a straight line, as shown enlarged and with exaggeration in FIG. 9. The opposite end 61' takes in radiation from laser 62. This laser may act through a lens 63. The laser, lens 63 and fibers 61 will be referred to as the laser unit.

In a slight variation (not shown) tapered fibers are used, their small end being at 61", while the large end of the tapered fibers is moved up to the mouth of the laser, omitting lens 63.

In FIG. 8 the record 64 is shown resting on a table or slide 65 below the rotor. Rotor 66 is identical with the rotors described; and the general arrangement is similar to that of FIG. 4, with the noted exceptions.

FIG. 5 shows one way of feeding a record. The record is fed at a slight angle to the direction of the rotor axis, in the direction of arrow 70, so that opposite ends of the scanning line 68 lie at opposite ends of adjacent character lines 69 or their elongations. The record is shown perforated for sprocket feed. Other ways of feeding may also be used, for instance placing the record on a slide movable in the direction of arrow 70. The slide is returned to starting position after a record has been scanned.

In the so far described embodiments the refractory part 27 is of general ring shape. It has approximately the same mean diameter as the circle on which the lenses (38, 38') are spaced about the rotor axis. And it is displaced with respect to said circle in the direction of the rotor axis.

Figure 11:
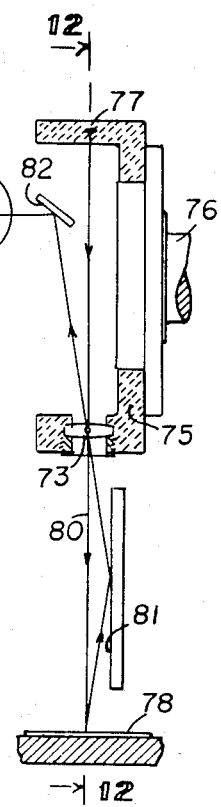
FIG. 11 is a view similar to FIG. 3 of a further embodiment of the invention.
Figure 12:
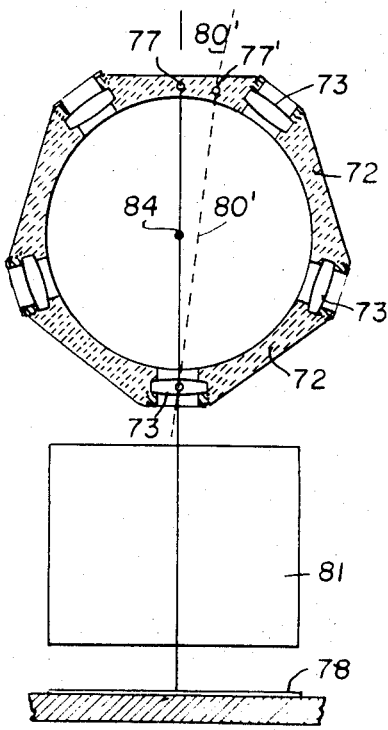
FIG. 12 is a section along lines 12—12 of FIG. 11, looking in the direction of the arrows.

FIGS. 11 and 12 illustrate an embodiment where the refractory part is shaped in sectors 72 alternating with the lenses 73 of the rotor and where said sectors have approximately the same axial position on the rotor as the lenses. The lenses 73 are shown inserted in a refractory body 75 of ring form that contains said sectors. They could also be formed integral with said body. In either case the portions adjacent the lenses are coated to render them opaque, to avoid reflections and interference.

The refractory body 75 is secured to a center portion and flange of a shaft 76. A laser unit (not shown) emits light from a straight line-like area 77. The beam passes through lens 73 (FIG. 11) to the record 78, as indicated by the arrow-heads at mean ray 80. Part of the diffused reflection from the lighted area of the record is gathered by plane mirror 81 and returns through lens 73. It passes to and is reflected at plane stationary mirror 82 and reaches photocell 83.

FIG. 12 shows a rotor with five lenses 72° apart. Each lens may scan through a turning angle of the rotor of 40° to 45°.

A laser unit (not shown here) produces a line-like area 77 of light close to the rotor periphery. It is stationary while the rotor turns past it, so that area 77 reaches positions of changing taper of refractory portion 72. Dotted lines 80' show the position of a mean ray relatively to portion 72. Area 77 is then at 77'. Ray 80' and the entire beam enter portion 72 in a direction radially towards the rotor axis 84. The beam is then bent by the taper of refractory portion 72 so that it passes through lens 73 and on to the record.

Figure 14:
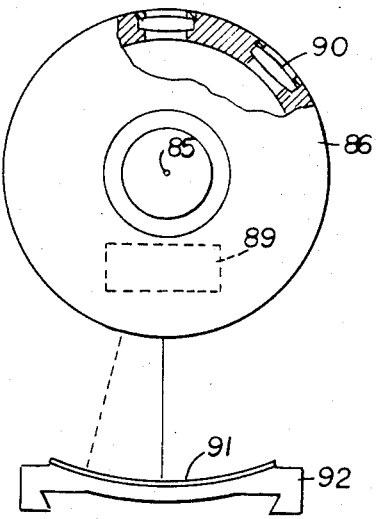
FIG. 14 is a side view of FIG. 13 taken along the rotor axis.

FIGS. 13 and 14 illustrate an embodiment with curved scanning line, a circular arc about the rotor axis 85, as described more fully in the named patent application Ser. No. 17,792. The line-like area of light 87 produced by a laser unit again lies inside the refractory part 27 secured to the rotor 86. Light is reflected by a prism 88 to a beam splitter 89, that reflects part of the light through lens 90 to a record 91. The latter hugs a concave cylindrical surface of a slide 92 that is mounted on a tiltable member (not shown), to effect a slide motion at a slight angle to the direction of the rotor axis 85. The required feed direction has been described with FIG. 5. Part of the diffused light reflected from the record returns through lens 90 and through beam splitter 89 to a stationary mirror 93 and thence to photocell 94.

For best results the rays illuminating the record should appear to come from the rotor axis 85. That is: the virtual image of line of light 87, as formed by prism 88 and the reflecting plane of beam splitter 89 should lie on the rotor axis.

The use of a refractory part (27, 72) of varying thickness, rigid with a rotor containing lenses, is broadly applicable to light sources of restricted angular sweep.

While the invention has been described in connection with several embodiment thereof, it is capable of further modifications by simply applying the knowledge and practice in the art to which the invention pertains, and without departing from the spirit of the invention. For definition of its scope it is relied on the appended claims.

I claim:
1. In an optical scanner comprising
   a rotor that contains a plurality of lenses equally spaced about its axis of rotation,
   a support for a record bearing at least one line of characters, and
   a unit adapted to emit light from a stationary area,
   said lenses being dimensioned and positioned with respect to said area to form an illuminated image of said area on the record, whereby the illuminated area moves along said line of characters on rotation of the rotor,
   the improvement wherein said light-emitting unit includes
   a laser, which emits a narrow beam of light,
   the beam of said laser unit has an angular sweep less than the sweep required to sufficiently illuminate the whole length of said line of characters,
   a refractory part rigid with said rotor and extending in a circle about the rotor axis, said part having a varying thickness for deflecting said beam increasingly with increasing distance from a central position, to compel said beam to swing in the direction of movement of the lens that forms said illuminated area, and means for directing light received from the illuminated area of the record to a photocell.

2. An optical scanner according to claim 1, wherein said illuminated area extends along a straight line, the line-like area of light emission is placed in the proximity of said refractory part.

3. An optical scanner according to claim 2, wherein the line-like area of light-emission is placed within said refractory part.

4. In an optical scanner having a rotor with lens means for projecting a beam of light to a record, whereby the projection moves on the record as the rotor turns, the improvement wherein a laser unit provides a stationary narrow area of light emission that is longer than wide, extending in the general direction of the rotary axis of said rotor, and refractory means is provided, in close proximity to said area, for deflecting the narrow beam of light coming from said area to swivel it in the direction of motion of the lens projecting said beam, and said refractory means is rigid with said rotor and extends circularly about the rotor axis.

5. In an optical scanner, the combination according to claim 4, wherein said refractory means contains sectors alternating with said lenses and having approximately the same axial position on the rotor as the circle on which its lenses are arranged.

6. In an optical scanner, the combination according to claim 4, wherein said rotor contains a plurality of lenses equally spaced in a circle about its axis, said refractory means is of ring shape and has straight profiles extending in the direction of the rotor axis.

7. In an optical scanner, the combination according to claim 6, wherein the inside surface of the refractory part is a surface of revolution coaxial with the rotor.

8. In an optical scanner, the combination according to claim 6, wherein said refractory means is a refractory part of varying thickness and the outside surface of said refractory part extends along a polygon.

9. In an optical scanner, the combination according to claim 6, wherein said refractory ring has approximately the same mean diameter as the circle on which said lenses are arranged, and is displaced in the direction of the rotor axis with respect to said circle.

* * * * *